United States Patent [19]

Daniher et al.

[11] 3,856,791

[45] Dec. 24, 1974

[54] PREPARATION OF AMIDES

[75] Inventors: Francis A. Daniher, Darien; Joel A. Zaslowsky, Olympia Fields, both of Ill.

[73] Assignee: CPC International, Inc., Englewood Cliffs, N.J.

[22] Filed: Nov. 20, 1972

[21] Appl. No.: 308,213

[52] U.S. Cl.... 260/247.7 H, 260/239 A, 260/243 B, 260/247.1 T, 260/247.2 B, 260/268 C, 260/293.65, 260/293.74, 260/293.85, 260/293.86, 260/326.4, 260/326.5 E, 260/326.83, 260/404, 260/455 A, 260/471 R, 260/558 R, 260/558 D, 260/561 R, 260/561 B, 260/561 HL, 260/562 R, 260/566 AC, 260/482 C, 260/561 N

[51] Int. Cl. .................... C07d 87/28, C07d 87/36

[58] Field of Search..... 260/247.7 H, 558 R, 561 R, 260/557 R, 404, 326.5 E, 293.86

[56] References Cited
UNITED STATES PATENTS

| | | | |
|---|---|---|---|
| 3,547,960 | 12/1970 | Hauser | 260/544 R |
| 3,562,276 | 2/1971 | Ceotino et al. | 260/247.7 H |
| 3,590,041 | 6/1971 | Kleeman et al. | 260/247.7 H |
| 3,657,325 | 4/1972 | Siggins | 260/558 R |
| 3,668,238 | 6/1972 | Clemence | 260/247.7 H |
| 3,686,302 | 8/1972 | Optiz | 260/544 K |

OTHER PUBLICATIONS

Klosa, J. Fur Prak. Chem. 4 Reihe, Vol. 19 (1963) pp. 45–55.

Primary Examiner—Lorraine A. Weinberger
Assistant Examiner—Richard D. Kelly
Attorney, Agent, or Firm—Albert P. Halluin

[57] ABSTRACT

Amides are prepared by contacting phosgene with a mixture of an organic compound containing at least one active hydrogen atom, as determined by the Zerewitinoff method and an acid salt of an amine, wherein said acid has a $pK_a$ value not substantially above about 6.

15 Claims, No Drawings

PREPARATION OF AMIDES

BACKGROUND OF THE INVENTION

1. Statement of the Invention

This invention relates to a novel method for producing amides by contacting phosgene with a mixture of an organic compound containing at least one active hydrogen atom and an acid salt of an amine.

2. Description of the Prior Art

Heretofore, it has been known that the one-step phosgenation of a mixture of an amine such as diethylamine and an organic compound having an active hydrogen atom such as a phenol can lead to the formation of certain important amides such as N,N-diethylphenylcarbamate, e.g., U.S. Pat. No. 3,057,910 to Fischer, et al. The state of the art in this regard, however, shows that certain inherent disadvantages are present in this one-step process, one of the disadvantages being the use of substantial excess of the reagents, phosgene and amine. For example, it is disclosed in said patent that at least a 50 mole percent excess of amine to phenol is employed and the phosgene used must be used in excess over the amine of up to 50 mole percent.

The one-step phosgenation of organic compounds having an active hydrogen atom, other than phenols, are subject to several shortcomings and can be understood by consideration of the reaction between phosgene and aliphatic carboxylic acid amides. For example, it is disclosed in U.S. Pat. No. 3,644,374 that the reaction of an excess amount of phosgene with an amide such as N,N-dimethylpropionamide produces beta-chloro-beta-dimethyl amino methacryloyl chloride hydrochloride. Another explanation of the shortcomings of some one-step phosgenation processes can be understood by consideration of the reaction of carbamoyl chlorides, formed by the intermittent reaction of phosgene and amine, with an excess amount of amine which produces ureas. It is postulated that the formation of aliphatic carboxylic acid amides during the one-step phosgenation process is accompanied by a concurrent destruction of the newly formed amide to the amine, as described in U.S. Pat. No. 3,644,374. Accordingly, it is understood why many of the prior art processes utilizing phosgene as a reactant first react phosgene with a single reactant, and thereafter, contact the intermediate reaction product with the remaining reactant or reactants so as to reduce the formation of undesired products.

Several multi-step processes for preparing amides utilizing phosgene are known. For example, it is known that certain amides may be prepared by reacting carbamoyl chlorides with carboxylic acids, as described in German Pat. No. 875,807; French Pat. No. 1,426,086; and the article by Lawson, Jr., et al, *J. Org. Chem.*, Vol. 28, pp. 232–235 (1963). Similarly, it is known that certain amides, such as the carbamates, may be prepared by reacting carbamoyl chlorides with various alcohols. The multi-step processes are not desirable because the carbamoyl chlorides must be prepared by a separate process under carefully controlled conditions. For example, carbamoyl chlorides are prepared by the reaction of amines with phosgene and the presence of excess amine will in turn react with carbamoyl chlorides to form ureas. Additionally, it is known that some carbamoyl chlorides are very unstable, and often lose hydrogen chloride to form isocyanates which in turn trimerize. Since this process depends upon the efficient formation of carbamoyl chlorides, the process does not enjoy the flexibility often desired in preparing various substituted amides. It is also known that certain amides, such as carbamates, may be prepared by reacting phosgene with alcohols to form carbonates followed by reaction of the carbonate with an amine. Such processes generally require the presence of a base such as alkali or a tertiary amine during the phosgenation process to tie-up the hydrogen chloride formed during the reaction, which requires additional purification techniques to obtain the desired carbamate.

SUMMARY OF THE INVENTION

It has now been found that the disadvantages and the formation of undesirable by-products heretofore associated with the one-step and multi-step processes for preparing amides utilizing phosgene can be reduced by contacting phosgene with a mixture of an organic compound containing at least one active hydrogen atom, as determined by the Zerewitinoff method and an acid salt of an amine, wherein said acid has a $pK_a$ value not substantially above about 6. It is an important aspect of the process of the invention to provide an acid salt of the amine wherein the acid has a $pK_a$ value such that the amine exists in the form of its acid salt, rather than in the form of a free amine during the phosgenation process. By maintaining the above-described conditions, the yields of the desired amide are increased and the formation of undesirable by-products are reduced.

DESCRIPTION OF THE PREFERRED EMBODIMENTS

Prior art processes for preparing amides utilizing phosgene as a reagent generally have required the use of an added base, e.g., alkali or tertiary amine, to absorb the acid formed during the phosgenation process. The process of the present invention unexpectedly can be accomplished with good yields and conversions without the addition of an added base. In fact, it has been found necessary pursuant to the practice of the present invention, to maintain the amine reactant in the form of its acid salt throughout the course of the process. In other words, the process of the invention is conducted by contacting phosgene with an organic compound containing an active hydrogen atom and an amine in the form of its acid salt. Since hydrogen chloride is formed during the process, the acidic nature of the reaction system is maintained during the phosgenation process.

The process of the invention is conveniently effected by contacting phosgene in the form of a gas or a liquid with an "amine reactant" in the form of its acid salt, wherein the acid which forms the acid salt has a $pK_a$ value not substantially above about 6, and a "reactive organic compound containing at least one active hydrogen atom, as determined by the Zerewitinoff method." As a preferred embodiment of the invention, the above-described "organic compound" will act as the acid salt when said "organic compound" is an organic carboxylic acid having a $pK_1$ value not substantially above about 6. In such an instance, phosgene is simply contacted with the amine salt of the organic carboxylic acid.

The various terms and expressions referred to above with respect to the reactants employed in the process and in the discussion and claims herein are defined as follows.

THE AMINE REACTANT

Any primary or secondary amine which is capable of forming an acid salt can be used as the "amine" reactant in the process of the present invention. The amine reactant suitable for the process of the invention will have at least one active hydrogen atom bonded to the nitrogen atom of the amine, such that the amine can form an acid salt and the desired amide reaction product. In general, the primary and secondary amines useful in the practice of the invention may be represented by the formula:

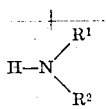

wherein $R^1$ and $R^2$, when taken separately, are hydrogen, aliphatic hydrocarbon having up to about 20 carbon atoms, cycloalkyl having from 3 to about 8 carbon atoms, or bicycloalkyl having from 5 to about 8 carbon atoms, aromatic hydrocarbons having from 6 to about 15 carbon atoms, $R^1$ and $R^2$, when taken together with the nitrogen atom to which they are attached, are: azetidino, pyrrolidino, piperidino, piperazino, morpholino, or thiomorpholino, and the like and their derivatives.

Illustrative aliphatic amines which can be employed in the form of their acid salts in the process of this invention include, among others:
 ammonia,
 methylamine,
 dimethylamine,
 ethylamine,
 ethylmethylamine,
 n-propylamine,
 isopropylamine,
 methylpropylamine,
 n-butylamine,
 sec-butylamine,
 tert-butylamine,
 isobutylamine,
 n-amylamine,
 n-hexylamine,
 ethylenediamine,
 tetramethylenediamine,
 pentamethylenediamine,
 beta-phenylethylamine,
 amphetamine,
 benzedrex,
 benzylamine,
and the like, and their derivatives.

Illustrative aromatic amines which can be employed in the form of their acid salts in the process of this invention include, among others:
 aniline,
 N-methylaniline,
 N-ethylaniline,
 o-, m- and p-chloroanilines and 2,4-dichloroaniline,
 2,3-, 2,4-, 2,5-, 2,6-, 3,4- and 3,5-xylidines,
 o-, m- and p-phenylenediamine,
 o-, m- and p-toluidines,
and the like, and their derivatives.

Illustrative heterocyclic amines which can be employed in the form of their acid salts in the process of this invention include, among others:
 azetidine,
 pyrrolidine,
 piperidine,
 piperazine,
 morpholine,
 thiomorpholine,
and the like, and their derivatives.

In the process according to the present invention, the amine reactant is employed in the form of its acid salt. It is important, therefore, to first prepare the acid salt of the amine before contacting the same with phosgene in the presence of the organic compound containing at least one active hydrogen atom. Any acid can be used to form the salt of the amine. Preferably, the acid will have a $pK_a$ value not substantially above about 6. The acids contemplated by this invention include any organic or inorganic acid having a $pK_a$ value not substantially greater than about 6.

The term "$pK_a$" as used herein and in the claims is a term wellknown to those skilled in the art, and refers to the $-\log K_a$, wherein $K_a$ is the dissociation constant of the respective acid in an aqueous solution. The ordinarily known meaning of the term "$pK_a$" is referred to herein and is incorporated herein by reference.

As alluded to above, the acid which forms the acid salt of the amine may include any inorganic acid, providing it has a $pK_a$ value not substantially above about 6. Suitable inorganic acids include: the mineral acids such as the hydrohalides (hydrogen chloride, hydrogen bromide, hydrogen fluoride, etc.); sulfuric acid, phosphoric acid, nitric acid, fluorobaric acid and the like. Suitable sulfonic and phosphonic acids, such as p-toluene sulfonic acid, methane sulfonic acid, phenyl phosphonic acid, and the like may also be used. Among the inorganic acids suitable in preparing the acid salt of the amine, the hydrohalides are preferred, hydrogen chloride being particularly preferred.

Any of the known organic carboxylic acids may be used to prepare the acid salts of the amine used in the process of the invention, providing the $pK_a$ value of the organic carboxylic acid is not substantially above about 6. The organic acid may include the other reactant "organic compound containing at least one active hydrogen atom," when this latter compound is an "organic carboxylic acid" having a $pK_a$ value not substantially above about 6, or any other suitable organic acid. It is a particularly preferred embodiment of the invention to utilize, as the organic carboxylic acid, an "organic carboxylic acid" which acts as both the salt-forming agent and the "reactive organic compound containing at least one active hydrogen atom." Thus, a preferred embodiment of the invention involves phosgenating an ammonium salt of an organic carboxylic acid to prepare the corresponding carboxylic acid amide. In the description and claims hereinafter, the term "organic carboxylic acid" is meant to include either the acid which forms the acid salt of the amine, the organic compound containing at least one active hydrogen atom, or both. However, when the organic carboxylic acid contains an amine reactive group, such as, for example, a halogen atom (e.g., the compound, beta-chloropropionic acid), then the organic carboxylic acid is not used as the acid which forms the acid salt of the amine. In these cases, a suitably inert acid having a $pK_a$ not substantially above about 6 is used to form the amine salt, e.g., hydrochloric acid, etc.

The acid salt of the above-described amines to be employed in the process of the present invention may be formed by any convenient method known to those skilled in the art. For example, the acid salt of the amine may be prepared by a previous process or it may be formed by the combination of an acid and the amine just prior to contacting the phosgene with the mixture of the acid salt of the amine and the organic compound containing at least one active hydrogen atom.

In the event the organic compound containing at least one active hydrogen atom is to be the acid which is used to form the salt of the amine, it has been found that the salt can be conveniently prepared by simply reacting the two components just prior to contacting the same with phosgene. Other methods known to those skilled in the art for preparing acid salts of amine are contemplated to be within the scope of the present invention.

THE REACTIVE ORGANIC COMPOUND CONTAINING AT LEAST ONE ACTIVE HYDROGEN ATOM

The term "reactive organic compound containing at least one active hydrogen atom" as used herein and in the claims is meant to refer to any organic compound having at least one active hydrogen atom determinable by the Zerewitinoff method. This method is described in the literature, for example, Kohler, et al, *J. Am. Chem. Soc.*, 49, 3181 (1927). Any suitable organic compound containing at least one active hydrogen atom as defined herein may be used. These compounds contain groups such as

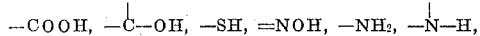

and the like. Examples of such organic compounds are organic carboxylic acids, alcohols, mercaptans, oximes and the like. Compounds containing mixed functional groups can also be used as the reactive organic compound containing at least one active hydrogen atom, such as hydroxy carboxylic acids, thiol carboxylic acids, amino alcohols, and the like.

The preferred reactive organic compounds containing at least one active hydrogen atom determinable by the Zerewitinoff method are the members selected from the group consisting of organic carboxylic acids, alcohols, mercaptans and oximes. A more detailed description of these preferred compounds as contemplated by this invention is found hereinbelow.

ORGANIC CARBOXYLIC ACID REACTANTS

Among the organic carboxylic acids suitable as the reactant organic compound containing at least one active hyrogen atom and/or useful in forming the acid salt of the amine reactant, there are included the branched chain, straight chain, or cyclic, saturated or unsaturated organic carboxylic acids. Similarly, such acid may be an aliphatic or aromatic, monobasic, dibasic, tribasic, etc. acid. Accordingly, when the term "organic carboxylic acid" is used herein, it must be clearly understood that the term embraces organic acids and derivatives thereof. Thus, the organic acids suitable as the reactant organic compound having at least one active hydrogen atom and/or useful in forming the acid salt of the amine reactant include, for example, the saturated aliphatic monocarboxylic acids, the saturated aliphatic dicarboxylic acids, aromatic acids, hydroxy acids, keto acids, and the like, having from about 1 to about 30 carbon atoms, and preferably those having from about 3 to about 20 carbon atoms.

Illustrative saturated aliphatic carboxylic acids which can be employed as the reactive organic compound having at least one entire hydrogen atom and/or the salt-forming agent for the amine reactant include, among others:
acetic acid,
chloroacetic acid,
dichloroacetic acid,
trichloroacetic acid,
glycolic acid,
propionic acid,
3-chloropropionic acid,
mandelic acid,
pyruvic acid,
levulinic acid,
n-butyric acid,
valeric acid,
caproic acid,
caprylic acid,
capric acid,
lauric acid,
myristic acid,
palmitic acid,
stearic acid,
oleic acid,
linoleic acid,
9-fluorenecarboxylic acid,
linolenic acid,
dihydroxy stearic acid,
ricinoleic acid,
and the like, and their derivatives.

Illustrative aliphatic dibasic and tribasic carboxylic acids which can be employed as the reactive compound containing at least one active hydrogen atom and/or the salt-forming agent for the amine reactant include, among others:
oxalic acid,
malonic acid,
malic acid,
succinic acid,
glutaric acid,
adipic acid,
pimelic acid,
suberic acid,
azelaic acid,
sebacic acid,
citric acid,
tartaric acid,
and the like, and their derivatives.

Illustrative aromatic carboxylic acids which can be employed as the reactive organic compound containing at least one active hydrogen atom and/or the salt-forming agent for the amine reactant include, among others:
benzoic acid,
phthalic acid,
o-, m- and p-halobenzoic acids,
o-, m- and p-toluic acids,
mesitoic acid,
acetylsalicyclic acid,
gallic acid,
p-nitrobenzoic acid,
terephthalic acid,
pyromellitic acid,
diphenic acid,
2-phenoxybenzoic acid,
and the like, and their derivatives.

Other illustrative "organic carboxylic acids" which can be employed as the reactive organic compound containing at least one active hydrogen atom and/or the salt-forming agent for the amine reactant include the alicyclic carboxylic acids, such as cyclohexanecarboxylic acid and abietic acid; the heterocyclic carboxylic acids, such as furoic acid, 2-pyrrolecarboxylic acid, nicotinic acid (3-pyridinecarboxylic acid), quinolinic acid, and the like and their derivatives.

When the above-described organic carboxylic acids are used as the reactive organic compound containing at least one active hydrogen atom in the process of the invention, the resulting product is a carboxylic acid amide of the formula:

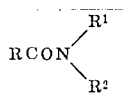

wherein R, R¹ and R₂ are substituted or unsubstituted hydrocarbyl radicals derived from the organic carboxylic acid and amine reactants, respectively, described above.

Many of the amides produced by the process of the invention are articles of commerce. For example, the reaction product of phosgene, m-toluic acid and the acid salt of diethylamine (preferably, the reaction product of phosgene with N,N- diethylammonium-m-toluate) which produces N,N-diethyl-m-toluamide is a well-known insect repellant. Many other amides are novel compounds which are useful as intermediates in preparing polymers, and useful as fungicides, and an sedative-hypnotics.

THE ALCOHOL REACTANTS

Generally speaking, any alcohol may be used in the process of the invention as the reactant organic compound containing at least one active hydrogen atom. Representative organic compounds include primary and secondary aliphatic and arylalkanols. While secondary alcohols are operable in the process of the present invention, they are found to be less desirable than the primary alcohols. Such alcohols may contain from one to about 30 carbon atoms, and preferably, contain from 3 to 20 carbon atoms. Non-limiting examples of suitable alcohols include methyl and ethyl alcohol, the linear and branched propyl-, butyl-, amyl-, hexyl-, heptyl-, octyl-, nonyl-, decyl-, dodecyl-, cetyl-, carnaubyl-alcohols, and the like. Suitable dihydroxy aliphatic alcohols include the glycols, the pentacols, as well as the compounds 2,2-methyl-n-propyl, 1,3-propandediol and Mephenesin; suitable trihydroxy aliphatic alcohols include the glycerols; suitable polyhydroxy aliphatic alcohols include the tetraols, for example, erythrol, pentaerythrol, and the like. Examples of the cyclic alcohols are cyclopentanol, cyclohexanol, cycloheptanol, cyclooctanol, adamantanol, and the like. Suitable arylalkanols include the compounds:

o-, m- and p-halobenzyl alcohols,
2,3-, 2,4-, 2,5-, and 3,4-dihalobenzyl alcohols,
o-, m- and p-halophenoxyalkanols (ethanol, propanol, etc.),
2,3-, 2,4-, 2,5- and 3,4-dihalophenoxyalkanols,
o-, m- and p-alkylbenzyl alcohols,
2,3-, 2,4-, 2,5-, and 3,4-dialkylbenzyl alcohols, and the like, and their derivatives.

When the foregoing alcohols are contacted with phosgene in the presence of the acid salt of the amine reactant, the amide which is formed is a carbamate. Many of the carbamates formed by the process of the present invention are known and useful compositions. For example, by contacting phosgene with ammonium hydrochloride and 2,2-methyl-n-propyl, 1,3-propanediol produces the corresponding dicarbamate known as Meprobamate; by contacting phosgene with methylamine hydrochloride and 3,4-dichlorobenzyl alcohol produces the corresponding carbamate known as Romate (a herbicide).

Carbamates have previously been prepared by the use of phosgene. However, the prior art methods have either required the reaction of phosgene with the alcohol in the presence of a base to absorb the hydrogen chloride formed during the reaction, followed by the reaction of the resulting carbonate with an amine or the use of a substantial excess of the reagents, phosgene and amine. It is unexpected that the process of the present invention can be accomplished by a one-step process in the absence of a base using the acid salt of an amine utilizing a substantially equimolar amount of reagents. It is believed that the acid salt of the amine acts as a protective agent during the initial stages of the phosgenation process and excessive amounts of amine and phosgene or the presence of a base are not required. Thus, the potential detrimental effect of phosgene is avoided by the process of the present invention.

THE MERCAPTAN REACTANTS

In addition to the carboxylic acids and the alcohols, one may use mercaptans as the reactive organic compound containing at least one active hydrogen atom determinable by the Zerewitinoff method. Suitable mercaptans useful in the practice of the present invention include propylmercaptan, butylmercaptan, octylmercaptan, and the like. These mercaptans, when contacted with phosgene in combination with the acid salt of the amine, form useful thiol carbamates which may be used as plant growth regulants.

THE OXIME REACTANTS

The oximes are another important class of reactive organic compounds containing at least one active hydrogen atom determinable by the Zerewitinoff method useful in the process of the present invention. Suitable oximes include acetone oxime (dimethyl ketoxime), acetaldehyde oxime, cyclohexanone oxime, benzaldehyde oxime, and the like.

PREFERRED REACTION CONDITIONS FOR THE IN SITU PROSGENATION

The process of the present invention can be effected by any suitable means, providing the phosgene is brought into concurrent contact with both the acid salt of the amine and the reactive organic compound containing at least one active hydrogen atom determinable by the Zerewitinoff method, or the combination of the latter two compounds. The combination of the latter two compounds referred to above is meant to include the combination of the "amine reactant" and the "organic carboxylic acid." This combination forms an ammonium salt of the organic carboxylic acid, which is the acid salt of the amine referred to herein and in the claims. Thus, a preferred aspect of the invention comprises phosgenating an ammonium salt of an organic carboxylic acid to form an amide. When the acid salt of the amine is not in the form of the above-described ammonium carboxylate, e.g., the hydrohalide salt of the amine reactant, it is important that the reactive organic compound containing at least one active hydrogen atom determinable by the Zerewitinoff method be concurrently present with the acid salt of the amine during the phosgenation process. It is, therefore, important that the acid salt of the amine and the reactive organic compound having at least one active hydrogen atom determinable by the Zerewitinoff method be intimately mixed together during concurrent contact with the phosgene. The concurrent mixture can be accomplished by adding the respective reactants all together or adding the acid salt of the amine and remaining reactants to the reactor just prior to phosgenation. The intimate mixture of the phosgene with the other reactant or reactants during the in situ phosgenation reduces the formation of undesirable by-products and improves the overall yields and conversions to produce desired amide in high yields.

The reactants, i.e., phosgene, the organic compound containing at least one active hydrogen atom and the amine in the form of its acid salt are preferably reacted together on an equimolar basis. Generally speaking, improved results are accomplished by employing a slight molar excess of phosgene, e.g., 5% to about 25% by weight excess over equimolar. The use of large excesses of phosgene is undesirable. In addition to being wasteful, it can also, in certain instances, result in the destruction of the reaction product. This is particularly true in the case of the preparation of aliphatic carboxylic acid amides. When the reactant organic compound containing at least one active hydrogen atom contains more than one active hydrogen atom which is desired to be converted to an amide, a correspondingly equimolar amount of phosgene and amine in the form of its acid salt should be employed for each active hydrogen atom on the reactant organic compound. In other words, it is preferred to employ a stoichiometric amount of the amine in the form of its acid salt for each active hydrogen atom on the organic compound, along with a stoichiomeric amount of more of phosgene.

Generally, the reaction is complete after contacting the respective reactants for a period up to about 30 hours, preferably, a duration of time ranging up to about 15 hours.

The process of the present invention can be effected in the presence or absence of an inert liquid solvent. However, it is preferred to carry out the process in the presence of an inert liquid which acts as a heat transfer medium. Suitable inert liquids include hydrocarbons such as cyclohexane, benzene, toluene, xylene, chlorinated aliphatic and aromatic hydrocarbons, such as 1,2-dichloroethane, chlorobenzene, o-dichlorobenzene, and the like.

The process is preferably carried out at elevated temperatures, for example, temperatures in the range of from about 60°C to about 180°C. Preferably, the reaction is conducted at temperatures in the range of from about 95°C to about 155°C.

The process of the present invention is normally conducted at atmospheric pressures, although subatmospheric and superatmospheric pressures can be tolerated. Accordingly, phosgene can be used in the form of either a gas or a liquid, depending upon the temperature and pressures employed during the process.

Following the completion of the reaction, the desired amide is conveniently isolated by techniques known in the art, such as distillation, crystallization, extraction or a combination of these techniques, etc. If desired, however, the amide may be recovered "as is" without the necessity of recovering or isolating the amide reaction product when the end use thereof dictates the use of the amide in its unisolated form.

The yields of the amide accomplished by the acidic, one-step phosgenation process of the invention are unexpectedly very high, and may range as high as above 80% or more. This is unexpected since the process is conducted under acidic conditions without the addition of a base to absorb the hydrogen chloride formed during the process. By conducting the process in one step in the absence of a base, a savings in reaction time and in recovery steps is accomplished, resulting in overall economic advantages over prior art processes.

The following examples serve to more fully describe the manner of making and using the above-described invention as well as to set forth the best modes contemplated for carrying out various aspects of the invention. It is to be understood that these examples in no way serve to limit the true scope of this invention, but rather are presented for illustrative purposes only.

Unless otherwise specified, the amides are prepared in a reaction vessel equipped with a stirrer, thermometer, and heating mantle which is fitted with a dry ice/acetone condenser to prevent the loss of phosgene. The percentages are by weight, except for the yield which are represented in mole percent.

EXAMPLE 1

Preparation Of N,N-Dimethyloctanamide

Phosgene (124 g.; 1.25 moles) is slowly distilled over a seven (7) hour period into a stirred slurry of n-octanoic acid (144 g.; 1.00 mole) and dimethylamine hydrochloride (81.5 g.; 1.00 mole) in 152 g. of xylene heated at 130°–138°C. After phosgene addition is complete, the reaction mixture is refluxed for 25 hours. The mixture is cooled, washed with 5% sodium bicarbonate solution, water, and dried over sodium sulfate. The solution is filtered and the xylene removed at reduced pressure. The residue is distilled to give 141.8 g., 83% of N,N-dimethyloctanamide, b.p. 98°–105°C/1.6 mm. Hg.

EXAMPLE 2

Preparation Of N,N-Dimethyloctanamide

This example illustrates the use of the organic compound containing at least one active hydrogen atom as the acid which forms the acid salt of the amine.

A solution of dimethylamine (47.3 g.; 1.05 moles) in 50 g. of xylene is added dropwise during a one-half hour period to a stirred solution of n-octanoic acid (144 g.; 1.00 mole) in 100 g. of xylene to obtain the dimethylammonium salt of n-octanoic acid. The reaction temperature is maintained at 40°–50°C by external cooling. The solution is then heated to 97°C and phosgene (118 g.; 1.19 moles) is distilled into the stirred reaction mixture over a six and one-half hour (6.5) period. Heating is continued during the phosgene addition and the reaction temperature ultimately rises to 155°C. After the phosgenation is complete, the reaction mixture is heated at reflux for 0.75 hour and then cooled to room temperature. The xylene solution is washed with 5% sodium bicarbonate solution, water, and then dried over anhydrous magnesium sulfate. The solution is filtered, and the solvent evaporated at reduced pressure. The residue is distilled to give 142 g., 83% of N,N-dimethyloctanamide.

EXAMPLE 3

Preparation Of N,N,N',N'-Tetramethyladipamide

Phosgene (212 g.; 2.14 moles) is slowly distilled over a seven (7) hour period into a stirred slurry of adipic acid (146 g.; 1.00 mole) and dimethylamine hydrochloride (1.63 g.; 2.00 moles) in 400 g. of xylene heated at 135°–140°C. After phosgene addition is complete, the reaction mixture is heated with stirring at 140°C. The reaction mixture is cooled to room temperature and filtered to remove the solid which separated. This solid is extracted with hot xylene and the xylene separated. The xylene fractions are combined, concentrated at reduced pressure, and cooled to 0°C. The crude product is collected in two fractions to give 155 g. of material. Recrystallization from acetone-ether provides 115 g. of product having an m.p. of 82°–84°C. Reworking of the xylene mother liquors provides an additional 19.3 g. of product. The total yield is 134.3 g., 67% of the desired N,N,N',N'-tetramethyladipamide.

EXAMPLE 4

Preparation Of N,N-Diethyl-m-Toluamide

Phosgene (139 g.; 1.43 moles) is slowly distilled over an eleven hour period into a stirred mixture of m-toluic acid (136 g.; 1.00 mole) and diethylamine hydrochloride (109.5 g.; 1.00 mole) in 191 g. of toluene heated at 115°–124°C. After phosgene addition is complete, the reaction mixture is refluxed for 2 hours and then cooled to room temperature. The solvent is removed at reduced pressure and the residue distilled to give 135.4 g., 71% of the insect repellant, N,N-diethyl-m-toluamide having a b.p. of 110°–112°C/1.0 mm. Hg.

EXAMPLE 5

Preparation Of N,N-Diethyl-m-Toluamide

This example further illustrates the use of the organic compound containing at least one active hydrogen atom as the acid having a $pK_a$ value no greater than about 6 which forms the acid salt of the amine.

Diethylamine (76.8 g.; 1.05 moles) is added dropwise during a one-half hour period to a stirred solution of m-toluic acid (136 g.; 1.00 mole) in 191 g. of toluene to provide the dimethylammonium salt of m-toluic acid (N,N-diethylammonium-m-toluate). The reaction temperature is maintained below 45°C by external cooling. The reaction mixture is heated to 112°C and phosgene (122 g.; 1.23 moles) is added to the stirred mixture containing the diethylammonium salt of m-toluic acid over an eight (8) hour period. The reaction temperature ranged from 112°–123°C during phosgene addition. The reaction mixture is then refluxed for one hour and then cooled to room temperature. The toluene is removed at reduced pressure and the residue distilled to provide 155.8 g., 81.5% of the insect repellant, N,N-diethyl-m-toluamide.

EXAMPLE 6

Preparation Of N-Methylacetanilide

Phosgene (106.5 g.; 1.08 mole) is slowly distilled over an eight (8) hour period into a stirred mixture of N-methylaniline (107.2 g.; 1.00 mole) and acetic acid (60.0 g.; 1.00 mole) in 100 g. of toluene heated at 110°–115°C. (The combination of acetic acid and N-methylaniline forms N-methylanilinium acetate.) After phosgene addition is complete, the reaction mixture is heated at reflux for 28 hours. The mixture is cooled, the solvent removed at reduced pressure, the residue is distilled, and the fraction with a boiling point of 50°–135°C/5 mm. Hg. is collected. Recrystallization of this fraction from cyclohexane provides 51.2 g., 33.6% of N-methylacetanilide having a melting point of 98°–100°C.

EXAMPLE 7

Preparation Of 4-Acetylmorpholine

The procedure of Example 6 is substantially followed with the exception that morpholine is utilized in place of N-methyaniline wherein the ammonium salt of morpholinium acetate is phosgenated. After solvent removal at reduced pressure, 4-acetylmorpholine is obtained by distillation, b.p. 125°–129°C/23 mm. Hg.

EXAMPLE 8

Preparation Of N-acetylpyrrolidine

The procedure of Example 6 is substantially followed with the exception that pyrrolidine is utilized in place of N-methylaniline. After solvent removal at reduced pressure, N-acetylpyrrolidine is obtained by distillation, b.p. 112°–114°C/18 mm. Hg.

EXAMPLE 9

Preparation Of N-Acetylpiperidine

The production of Example 6 is substantially followed with the exception that piperidine is utilized in place of N-methylaniline. After solvent removal at reduced pressure, N-acetylpiperidine is obtained by distillation, b.p. 123°–125°C/30 mm. Hg.

EXAMPLE 10

Preparation Of N,N-Dimethylstearamide

Phosgene (62 g.; 0.62 mole) is slowly distilled over a six (6) hour period into a stirred slurry of stearic acid (145 g.; 0.51 mole) and dimethylamine hydrochloride (41.6 g.; 0.51 mole) in 160 g. xylene heated at 149°–153°C. After phosgene addition is complete, the reaction mixture is refluxed for 30 hours. The mixture is cooled to room temperature. The solvent is removed at reduced pressure and the residue distilled to provide 105 g., 66% yield of N,N-dimethylstearamide having a b.p. of 180°–200°C/0.05 mm. Hg. and a melting point of 45°–47°C.

EXAMPLE 11

Preparation Of N,N-Dimethyl-3-Chloropropionamide

Phosgene (84.5 g.; 0.85 mole) is slowly distilled over a five (5) hour period into a stirred mixture of 3-chloropropionic acid (87.0 g.; 0.80 mole), dimethylamine hydrochloride (65.4 g.; 0.80 mole) and 2.0 g. of Age Rite White inhibitor in 75.0 g. of toluene at 110°–123°C. After phosgene addition is complete, the reaction mixture is refluxed for 0.75 hour. The mixture is cooled and the solvent removed at reduced pressure. The residue is distilled to provide 83 g., 71% of N,N-dimethyl-3-chloropropionamide, b.p. 64°–67°C/0.2 mm. Hg.

In a similar manner, dimethylamine hydrochloride is replaced by ethylamine hydrochloride and diethylamine hydrochloride to provide N-ethyl-3-chloropropionamide and N,N-diethyl-3-chloropropionamide, respectively.

In another series of experiments, 3-chloropropionic acid is replaced by 2-methyl-3-chloropropionic acid to provide N,N-dimethyl-2-methyl-3-chloropropionamide.

The N,N-dimethyl-3-chloropropionamide prepared by the above procedure is useful as an intermediate in preparing other useful compounds. For example, dehydrohalogenation of N,N-dimethyl-3-chloropropionamide in the presence of a base obtains good yields of N,N-dimethylacrylamide (NNDMA), a monomer useful in preparing hydrophilic polymers and copolymers.

EXAMPLE 12

Preparation Of N,N-Dimethyl-n-Butylthiocarbamate

Phosgene (120 g.; 1.21 moles) is slowly distilled over a seven (7) hour period into a stirred mixture of n-butylmercaptan (90 g.; 1.00 mole) and dimethylamine hydrochloride (81.5 g.; 1.00 mole) in 115 g. of toluene at 105°–120°C. After phosgene addition is complete, the reaction mixture is refluxed for six (6) hours and then cooled to room temperature. The solvent is removed at reduced pressure and the residue is distilled to provide N,N-dimethyl-n-butylthiocarbamate, b.p. 108°–110°C/12 mm. Hg.

EXAMPLE 13

Preparation Of N,N-Dimethyl-n-Octylcarbamate

Phosgene (125.5 g.; 1.25 moles) is slowly distilled over a five (5) hour period into a stirred mixture of 1-octanol (130.2 g.; 1.00 mole) and dimethylamine hydrochloride (81.5 g.; 1.00 moles) and 110 g. of toluene heated at 112°–120°C. After phosgene addition is complete, the reaction mixture is refluxed for 2 hours and then cooled to room temperature. The reaction mixture is washed with 50 ml. of 5% hydrochloric acid, dried over anhydrous magnesium sulfate, filtered, and the solvent removed at reduced pressure. The liquid residue is distilled at reduced pressure to obtain 66.7 g., 33% of N,N-diethyl-n-octylcarbamate, b.p. 86°–94°C/0.52 mm. Hg.

EXAMPLE 14

Preparation Of Cyclohexanone 0-(Dimethylcarbamoyl) Oxime

Phosgene (109 g.; 1.10 moles) is slowly distilled over a seven (7) hour period into a stirred mixture of cyclohexanone oxime (113 g.; 1.00 mole) and dimethylamine hydrochloride (81.5 g.; 1.00 mole) in 125 g. of toluene heated at 114°–124°C. After phosgene addition is complete, the reaction mixture is refluxed for 8 hours and then cooled to room temperature. The solvent is removed at reduced pressure and the residue extracted with hot petroleum ether. Upon cooling the petroleum ether extract, the product crystallized to give cyclohexanone 0-(dimethylcarbamoyl) oxime, m.p. 53°–57°C.

We claim:

1. A process for preparing amides comprising contacting phosgene with an organic carboxylic acid and an acid salt of an amine, wherein said acid has a $pK_a$ value not substantially above about 6.

2. The process of claim 1, wherein said organic carboxylic acid and said acid salt of an amine are employed as an equimolar mixture.

3. The process of claim 1, wherein said acid salt of an amine is dimethylamine hydrochloride.

4. The process of claim 1, wherein said acid salt of an amine is an ammonium salt of said organic carboxylic acid and said amine.

5. The process of claim 4, wherein said ammonium salt is morpholinium acetate.

6. The process of claim 4, wherein said ammonium salt is N,N-diethylammonium-m-toluate.

7. The process of claim 4, wherein said ammonium salt is N-methylanilinium acetate.

8. The process of claim 1, wherein said organic carboxylic acid is 3-chloropropionic acid and said acid salt of an amine is dimethylamine hydrochloride to obtain N,N-dimethyl-3-chloropropionamide.

9. The process of claim 8, wherein said N,N-dimethyl-3-chloropropionamide is dehydrohalogenated in the presence of a base to form N,N-dimethylacrylamide.

10. A process for preparing amides comprising contacting phosgene with a substantially equimolar amount of an organic carboxylic acid and an acid salt of an amine, wherein said acid has a $pK_a$ value not substantially above about 6, in the presence of an inert solvent at elevated temperatures.

11. A process for the preparation of N,N-diethyl-m-toluamide comprising contacting phosgene with m-toluic acid and an acid salt of diethylamine, where said acid has a $pK_a$ value not substantially above about 6, said process being conducted in an inert liquid solvent at elevated temperatures.

12. The process of claim 11, wherein said m-toluic acid and acid salt of diethylamine are employed as an equimolar mixture.

13. The process of claim 11, wherein phosgene is employed in a slight molar excess.

14. The process of claim 11, wherein said acid salt of diethylamine is diethylamine hydrochloride.

15. The process of claim 11, wherein said acid salt of diethylamine is the diethylammonium salt of m-toluic acid.

* * * * *